United States Patent [19]
Yoshizawa et al.

[11] Patent Number: 5,787,464
[45] Date of Patent: Jul. 28, 1998

[54] COMPUTER SYSTEM INCLUDING A DUAL MEMORY CONFIGURATION WHICH SUPPORTS ON-LINE MEMORY EXTRACTION AND INSERTION

[75] Inventors: Ryokichi Yoshizawa, Katsuta; Takeshi Miyao, Hitachioota; Shigenori Kaneko, Nakaminato; Tomoaki Nakamura, Katsuta; Hidebumi Miyata, Hitachioota, all of Japan

[73] Assignees: Hitachi, Ltd., Tokyo; Hitachi Process Computer Engineering, Inc., Hitachi, both of Japan

[21] Appl. No.: 794,604

[22] Filed: Feb. 3, 1997

Related U.S. Application Data

[63] Continuation of Ser. No. 127,832, Sep. 28, 1993, abandoned.

[30] Foreign Application Priority Data

Sep. 29, 1992 [JP] Japan ................................ 4-259299

[51] Int. Cl.$^6$ ............................ G06F 13/00; G06F 12/06
[52] U.S. Cl. ........................ 711/115; 395/283; 711/170
[58] Field of Search ........................ 395/402, 405, 395/442, 492, 497.01, 283; 711/2, 5, 115, 165, 170

[56] References Cited

U.S. PATENT DOCUMENTS

| | | | |
|---|---|---|---|
| 4,951,248 | 8/1990 | Lynch | 711/2 |
| 5,235,687 | 8/1993 | Bacot et al. | 711/115 |
| 5,274,808 | 12/1993 | Miyao et al. | 395/650 |
| 5,319,751 | 6/1994 | Garney | 395/650 |
| 5,412,798 | 5/1995 | Garney | 395/500 |

FOREIGN PATENT DOCUMENTS 64-84352  3/1989  Japan.

Primary Examiner—Glenn Gossage
Attorney, Agent, or Firm—Kenyon & Kenyon

[57] ABSTRACT

A computer system and method for enabling memory expansion without shutting off the computer system are disclosed. The computer system has a dual memory configuration and supports memory insertion and extraction while being on-line. The memory content of one system may be copied to the memory of another system according to a predetermined priority or after a predetermined delay. Memory may be used efficiently during the insertion or extraction by securing a status management table expansion area in an expanded portion of memory. Memory may be expanded in computer systems that do not have an open memory slot by replacing the installed memory with a memory having a larger capacity.

4 Claims, 15 Drawing Sheets

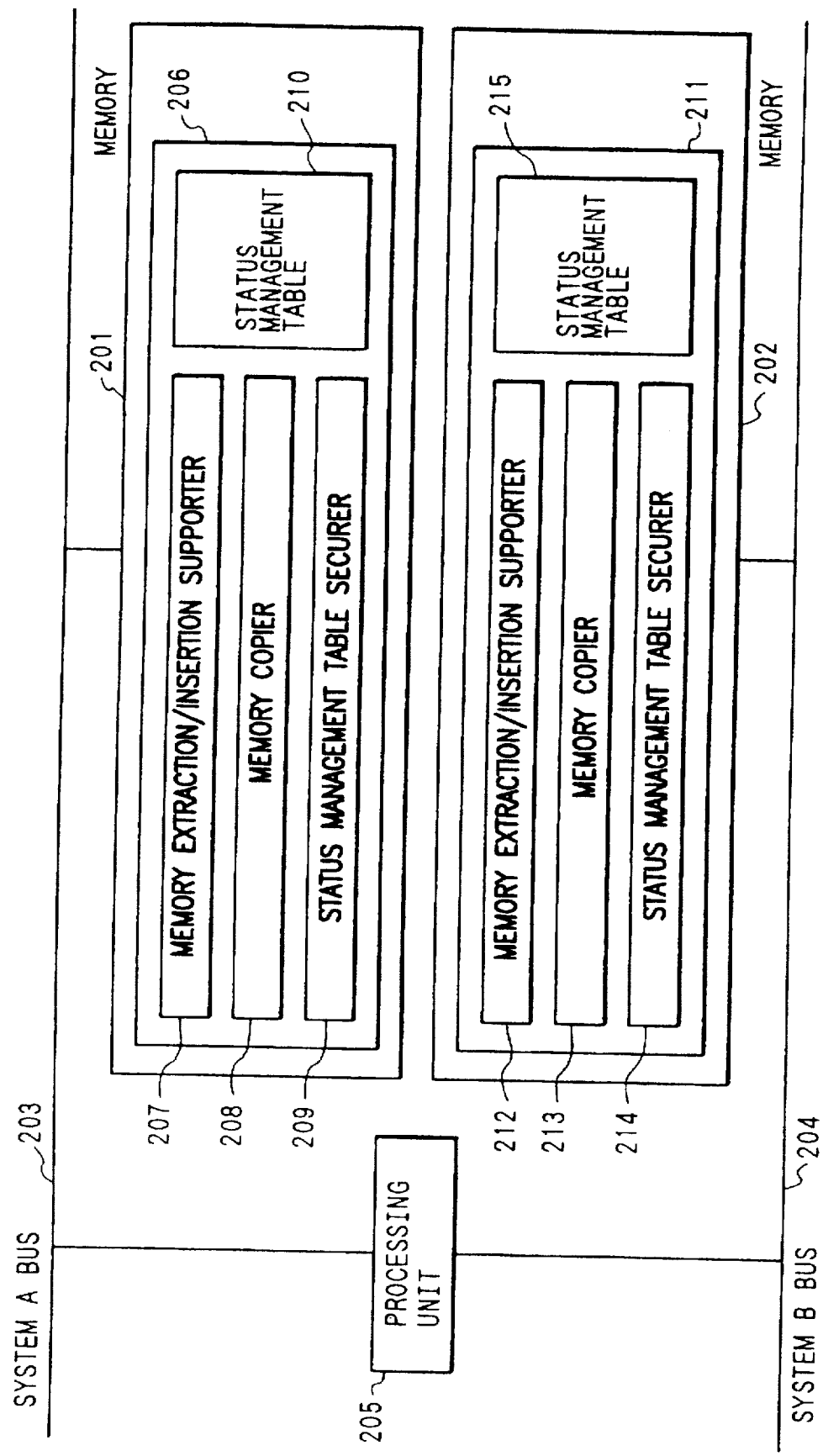

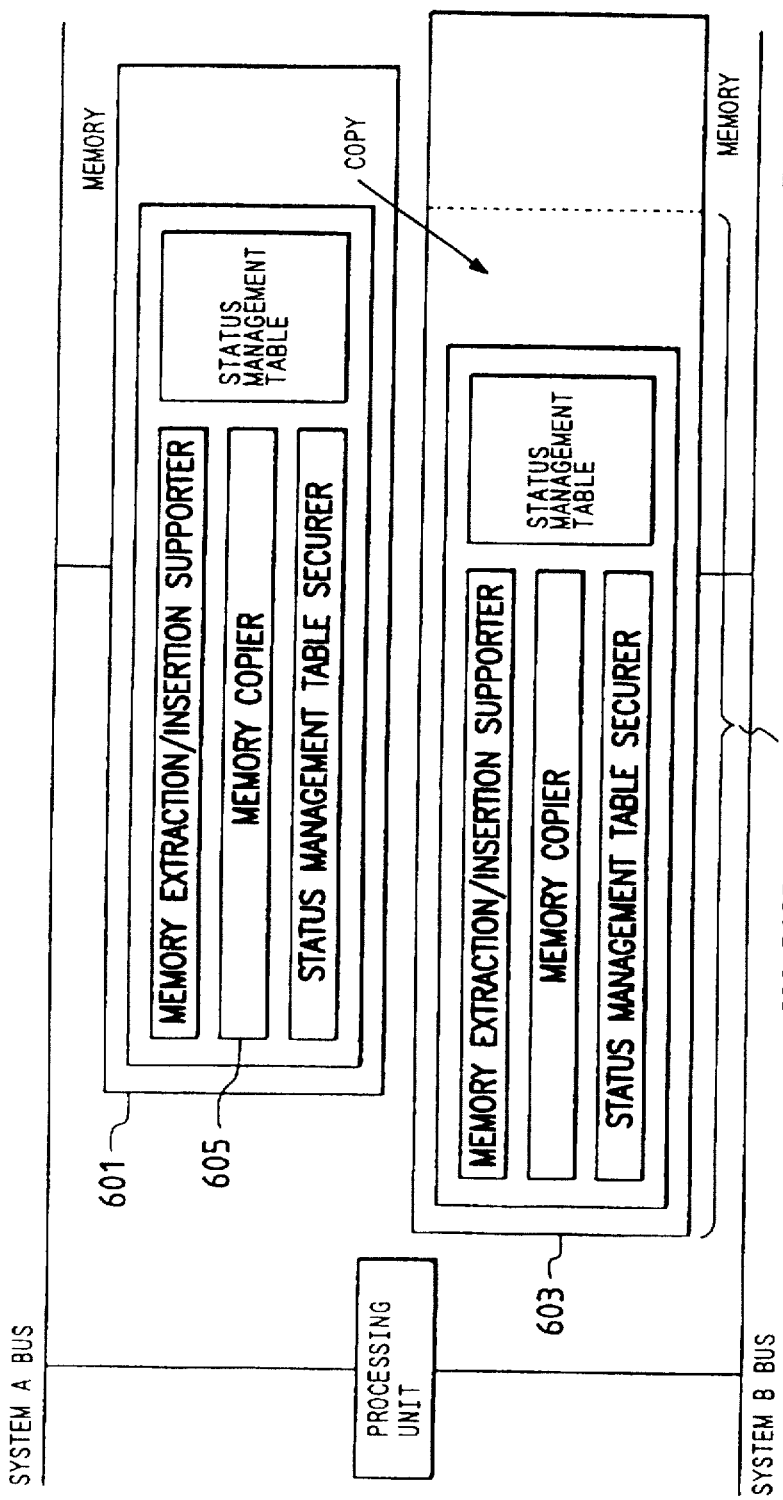
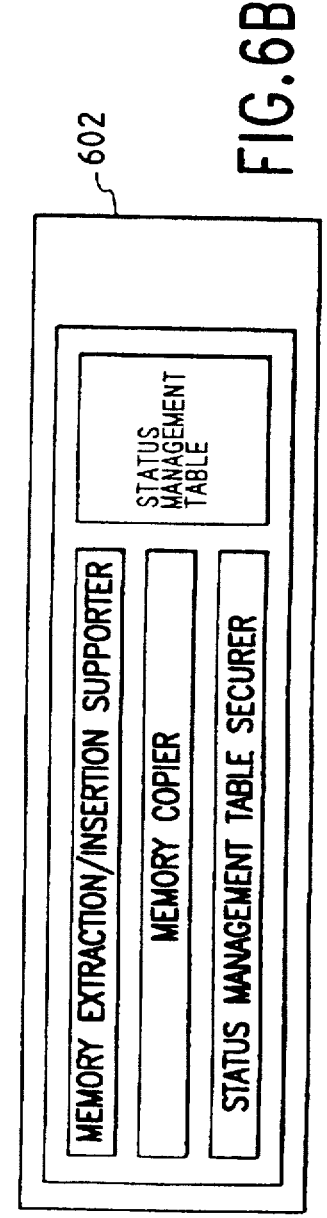
FIG.6A
FIG.6B

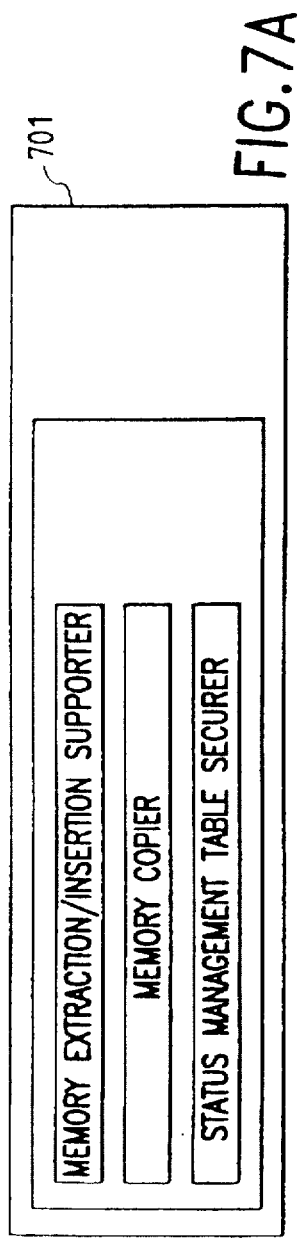
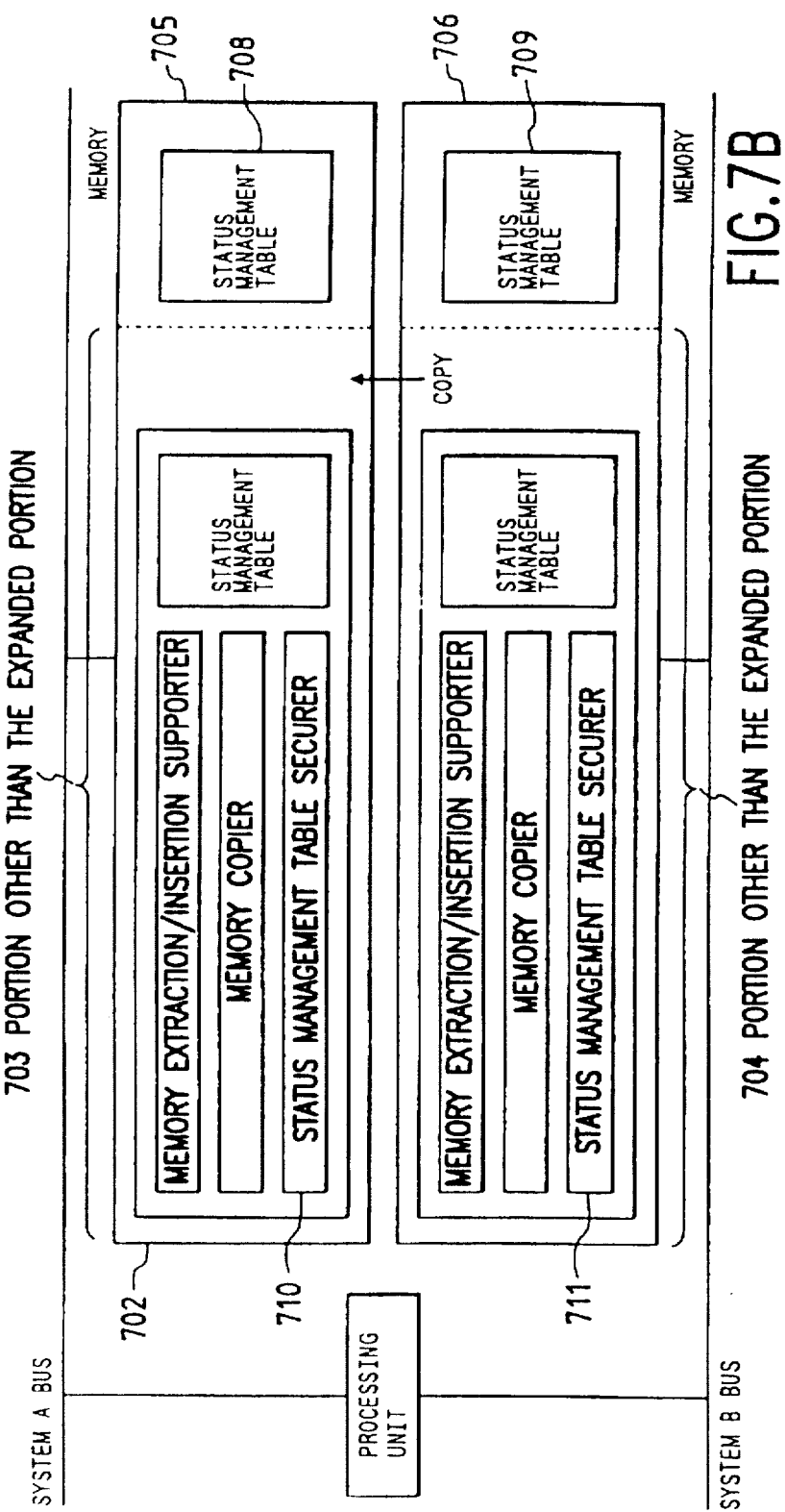

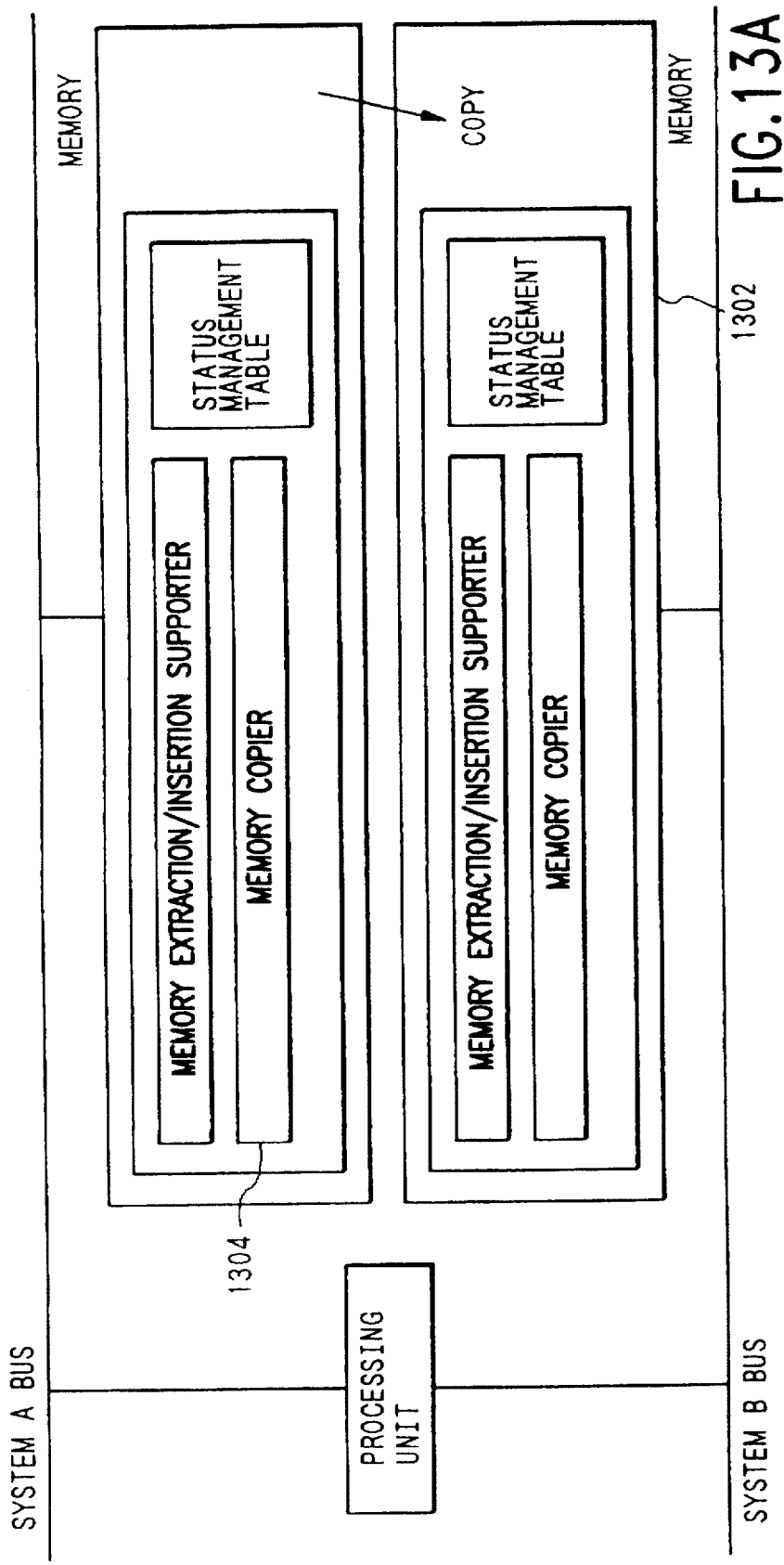
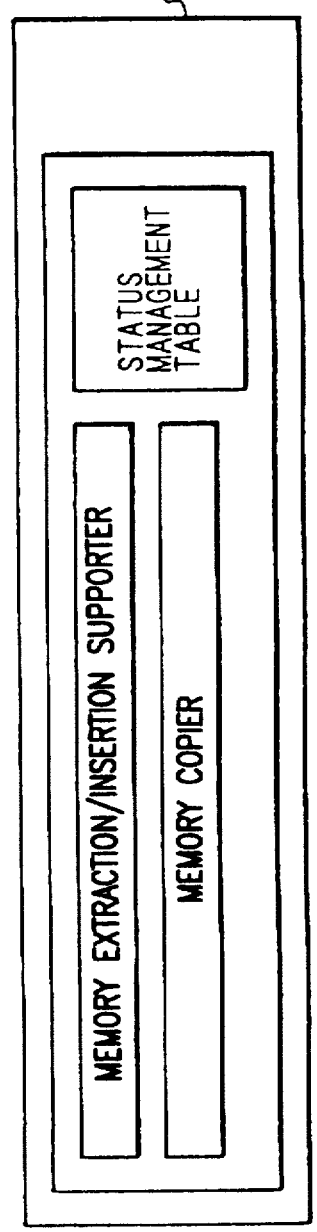
FIG.13A
FIG.13B

COMPUTER SYSTEM INCLUDING A DUAL MEMORY CONFIGURATION WHICH SUPPORTS ON-LINE MEMORY EXTRACTION AND INSERTION

This application is a continuation of application Ser. No. 08/127,832 filed 28 Sep. 1993, now abandoned.

BACKGROUND OF THE INVENTION

The present invention relates to a computer system including a dual memory configuration which supports on-line memory extraction or insertion, and particularly to a computer system in which maintenance can be performed without shutting off the system.

DESCRIPTION OF THE RELATED ART

Expansion of memory on-line (without shutting off the system) in the prior art has been performed by inserting a memory board into an open memory slot. In doing so, it was necessary to change the operating system table unless the management table for the expanded portion was secured.

On example of expanding memory on-line is disclosed in Japanese Patent Application Laid Open No. 64-84352, which does not realize memory expansion through exchange of a memory unit but through the addition of a new memory unit.

In the prior art, expansion of memory with a dual configuration has been realized by installing additional memory to an open memory slot, and therefore the system had to be shut off in the event of replacing the installed memory with a memory of larger capacity. For this reason, there was a problem with computer systems that do not have an open memory slot as they were not able to perform memory expansion without shutting off the system.

SUMMARY OF THE INVENTION

The present invention enables memory expansion without shutting off the system for computer systems that do not have an open memory slot by replacing the installed memory with a memory with larger capacity.

Further, an expanded status management table that stores information such as whether memory is used logically needs to be retained when expanding the memory. A method for predicting this status management table for the expanded portion of memory is available, although it creates an unused memory area until the memory is expanded.

Another object of the present invention is to use the memory efficiently until the memory is expanded by securing this status management table in the expanded memory at the time of memory expansion.

A characteristic of the present invention for accomplishing the objective of enabling memory expansion without shutting off the system is that it is equipped with a means for supporting memory extraction and insertion while being on-line and a copying means between dual memories.

In addition, another characteristic of the present invention for accomplishing the objective of using the memory efficiently is that it is equipped with a means for securing a logical status management table area of memory in an expanded memory.

The invention enables addition or exchange of memory while being on-line through means for supporting memory extraction and insertion while being on-line.

The invention also enables matching of the memory content of both systems and restarts dual operation as the invention copies the dual memory content to the inserted memory while on-line The invention also enables securing of status management table area from expanded memory and efficient use of memory through a means for securing logical status management table area of memory.

BRIEF DESCRIPTION OF THE DRAWINGS

FIG. 2 is a diagram showing an example of a dual memory configuration in an embodiment of the present invention.

FIGS. 6A and 6B are schematics that facilitate an understanding of the operation of an embodiment of the present invention.

FIGS. 7A and 7B are schematics that facilitate an understanding of the operation.

FIGS. 13A and 13B are diagrams explaining a third embodiment of the present invention.

DETAILED DESCRIPTION

Figure 1:
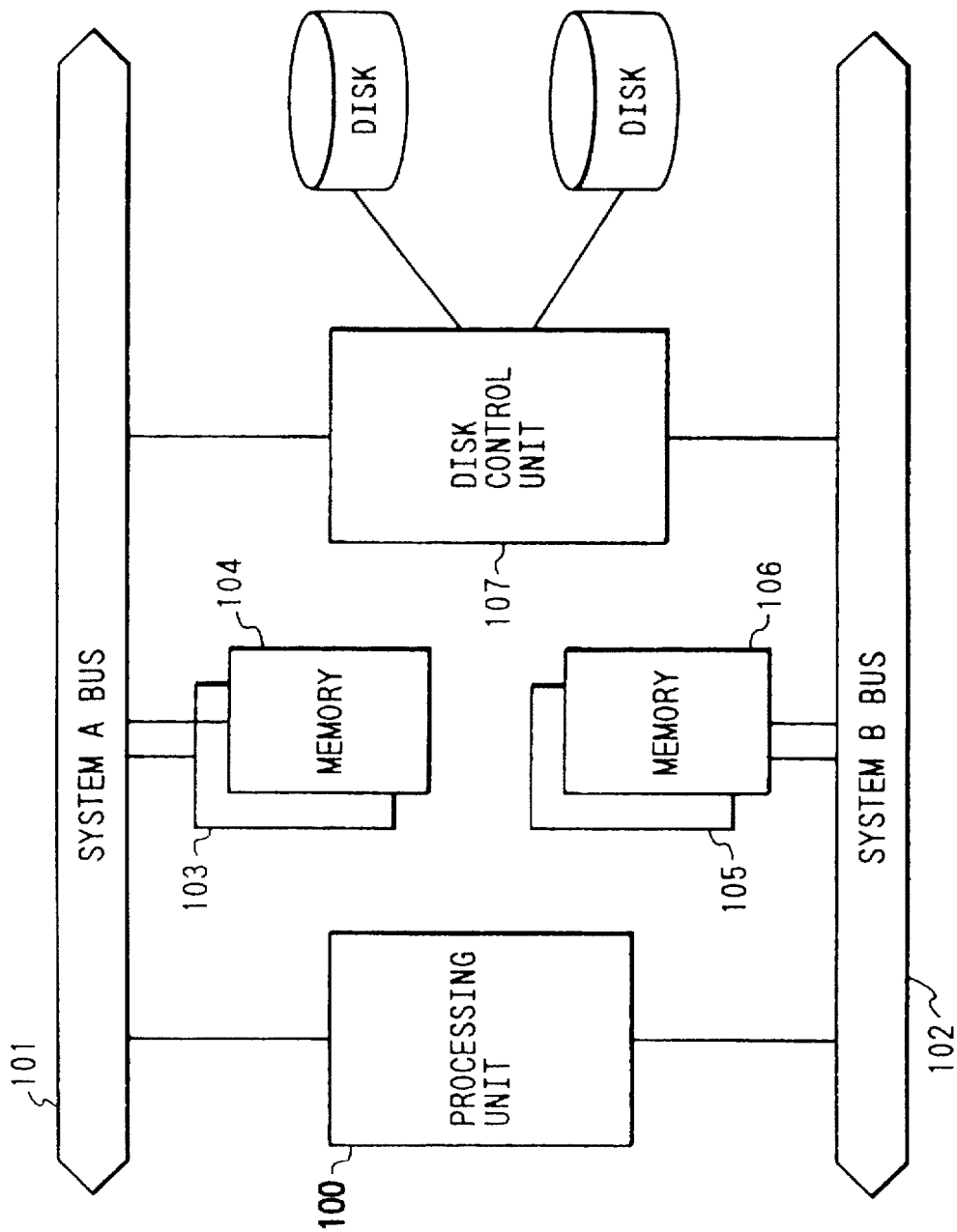
FIG. 1 is a diagram showing an example of a hardware configuration for an embodiment of the present invention.

An example of a hardware configuration is shown in FIG. 1. A processing unit 100 is connected to both system A bus 101 and bus system B bus 102 and performs data input/output to both systems. Meanwhile, memories 103 and 104 are connected to system A bus while memories 105 and 106 are connected to system B bus, with buses of both systems sending out identical data in synchronization. In other words, the memories of both systems are in dual operation as they input and output identical data at the same timing. Further, a disk control unit 107 is connected to both system A bus 101 and system B bus 102 and performs disk input/output control. While two memories are connected to each of both systems in this hardware configuration, two memories do not necessarily have to be connected to each system, although at least one memory needs to be connected when using the memory in dual configuration.

An example of a dual memory configuration is shown in FIG. 2. Memories 201 and 202 are connected to system A bus 203 and system B bus 204, respectively. Memories 201 and 202 contain operating systems (hereinafter referred to as "OS") 206 and 211, have memory extraction/insertion support means 207 and 212, memory copying means 208 and 213 and status management table secured means 209 and 214 as part of the OS program, and has memory status management tables 210 and 215 as a part of OS work data. A memory extraction/insertion support means 207 and 212, memory copying means 208 and 213 and memory status management table securing means 209 and 214 are executed by a processing unit 205 under the control of the OS.

A memory status management table is that which manages a logical status of memory for every defined unit such as pages and segments (pages shall be the unit in the following), and retains, for instance, information on matters such as whether the memory is used according to tasks, and the type of stored data (whether it is a command or a work data).

Figure 3A:
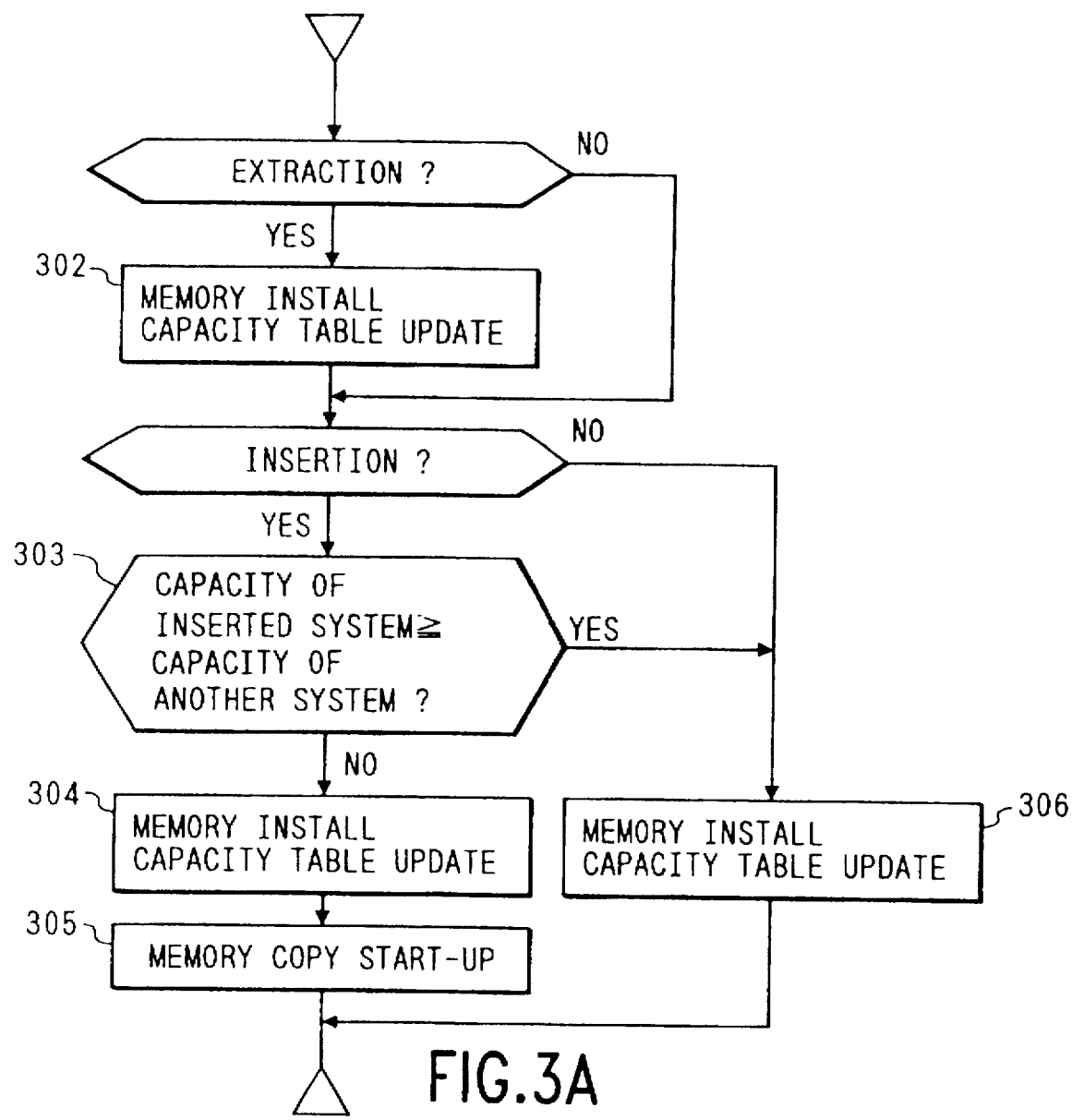
FIGS. 3A and 3B are diagrams explaining memory extraction/insertion support means in an embodiment of the present invention.
Figure 3B:
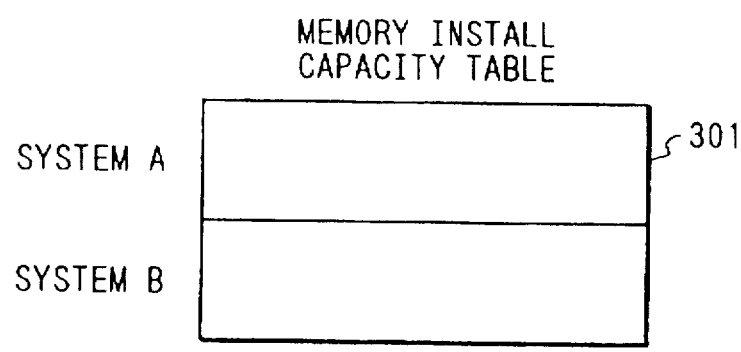

FIG. 3 is a diagram that explains the processing at a memory extraction/insertion support means. A memory extraction/insertion support means manages a memory installing capacity table 301 as shown in FIG. 3A and is started by the OS when a memory extraction/insertion event occurs. A memory installing capacity table 301 retains the installing capacity of both system A and system B, and exists within the work area of the OS. In addition, the event for a memory install extraction/insertion will be recognized by the OS through information reported to the processing unit at the time of memory/extraction and insertion.

In a case where an event of memory extraction is reported, the memory installing capacity after extraction is written on the memory capacity table (processing step 302). In a case where an event of memory insertion is reported, the memory capacity of the inserted system is compared with the memory capacity of another system (processing step 303). If the memory capacity of the inserted system is greater or equal, the memory capacity after extraction is written on the memory capacity table (processing step 304), followed by start-up of the memory copying means (processing step 305). If the memory capacity of the inserted system is smaller, processing is completed by writing the memory capacity after extraction on the memory capacity table (processing step 306). The reason for not starting up the memory copying means when the installing capacity of the inserted system is smaller is that, even if the memories of both systems are matched by copying, dual configuration usage is possible only up to the memory capacity of the inserted system, resulting in reduction of memory capacity compared to that before performing memory copy. This processing will not be incorporated because reduction in memory will raise the load on the memory which, in turn, will have negative influence on on-line processing.

Figure 4:
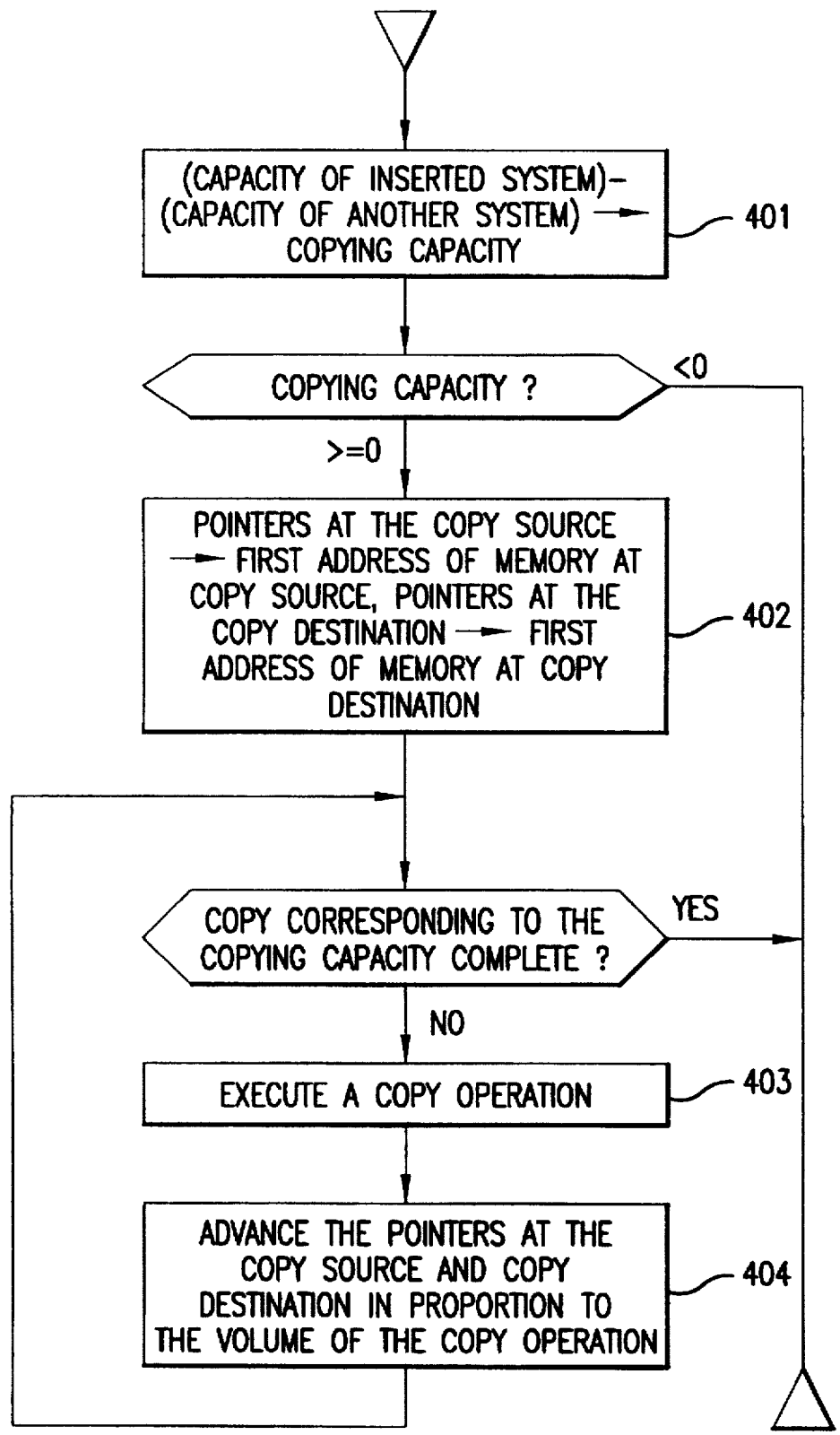
FIG. 4 is a diagram explaining memory copying means in an embodiment of the present invention.

FIG. 4 is a diagram explaining a memory copying means. First, the copying capacity is obtained by subtracting the capacity of another system from the memory capacity of the inserted system (processing step 401). The copying is not performed if this value is negative. If the memory capacity of the inserted system is greater than or equal to the capacity of the other system, the pointers at the copy source and copy destination are set on the first address of the copy source and copy destination, respectively (processing step 402), and the pointers at the copy source and copy destination are advanced in proportion to the volume of the copy (processing step 404) every time a copy operation is executed (processing step 403). A copy processing is completed once a copy corresponding to the copying capacity is completed.

Figure 5A:
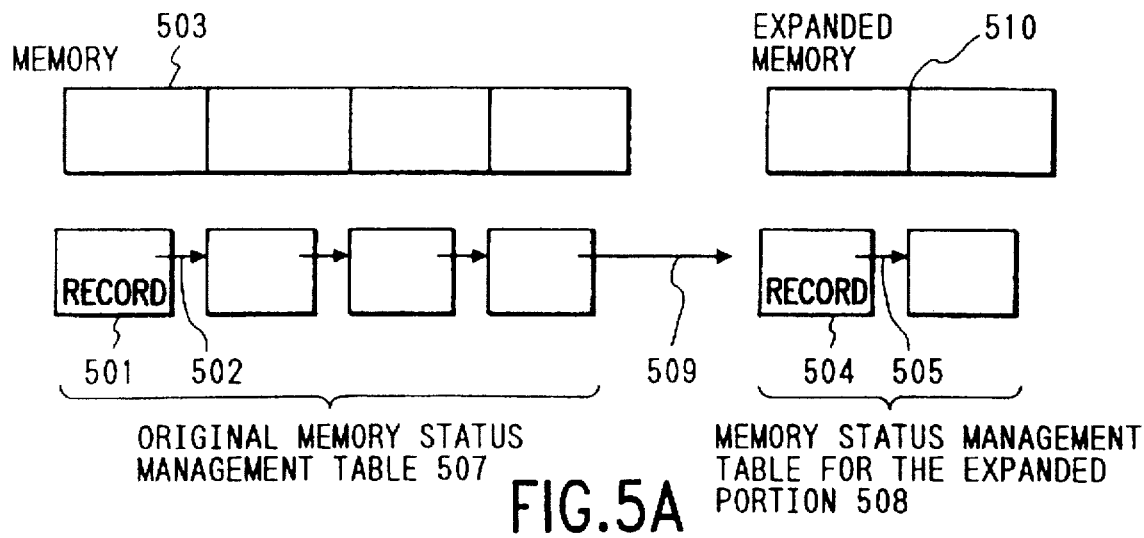
FIGS. 5A and 5B are diagrams explaining memory status management table securing means in an embodiment of the present invention.
Figure 5B:
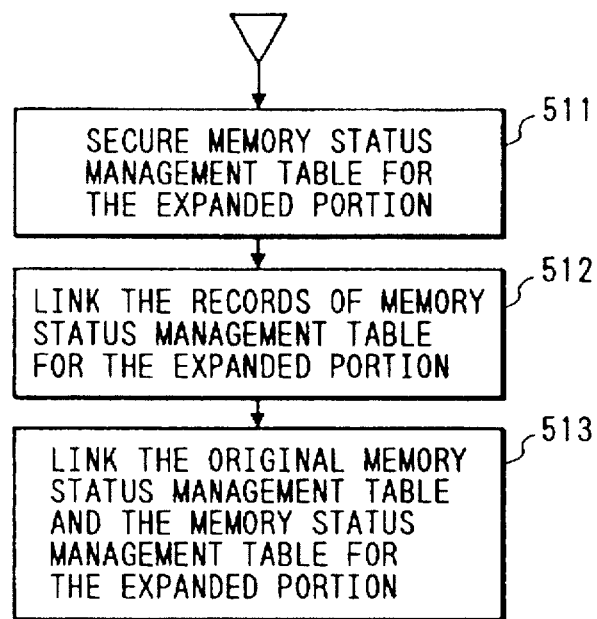

FIG. 5 is a diagram explaining a memory status management table securing means. A memory status management table has a record 501 on each page, and the records are linked by a pointer 502. The position from the first record on each page is identical to the position of the record in the first memory status management table record which is managing it. As a result, each page in memories 503 can be matched with the memory status management table record. Memories 503 refer to the same hardware as the memories in FIG. 1 (103, 104, 105, 106) and are described in such a way so that the page-wise division can be identified.

When memories 503 are expanded, a memory status management table record 504 for the expanded portion corresponding to the expanded memory 510 is secured (processing step 511), and each record in the expanded memory status management table is linked by a pointer 505 (processing step 512). Then the original memory status management table 507 and the expanded memory status management table 508 are linked by a pointer 509 (processing step 513).

The descriptions of system A and system B in the following explanation can also be reversed without effect on the present invention.

The memory maintenance method according to the present invention is explained by using FIGS. 6 to 11. Shown here first is an embodiment having only one memory insertion slot each on system A and system B, and an embodiment that has two memory insertion slots on both system A and system B with one of two slots in both systems not having a memory inserted.

An embodiment that has only one memory insertion slot each on system A and system B is described in the following by using FIGS. 6 to 8.

FIGS. 6A and 6B show a condition in which a memory 602 has been extracted from system B and a memory 603 is inserted. The content of system A memory 601 is copied by a memory copying means 605 to a portion of system B memory that has not been expanded 606.

FIG. 7B shows a condition in which a memory 701 shown in FIG. 7A has been extracted from system A and a memory 702 is inserted. The content of system B memory 704 is copied by a memory copying means 707 to a portion of system B memory that has not been expanded 703. Further, memory status management tables 708 and 709 that manage expanded memories 705 and 706 are secured inside expanded memories 705 and 706 by memory status management table securing means 710 and 711.

Figure 8:
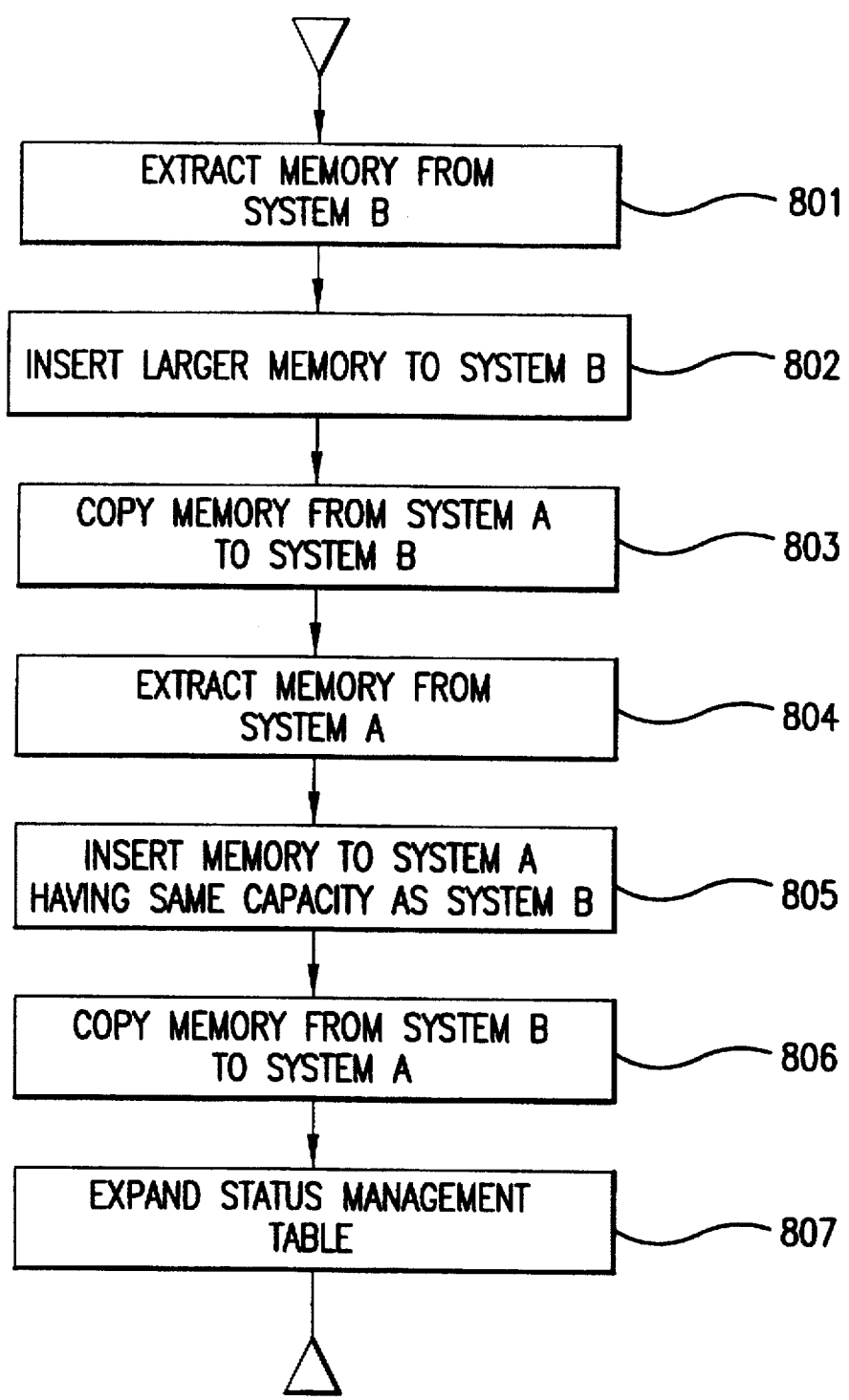
FIG. 8 is a schematic that facilitates an understanding of the operation of an embodiment of the present invention.

FIG. 8 is a diagram showing a processing flow of the content described in FIGS. 6 and 7. First the memory is extracted from system B (processing step 801) and a larger memory is inserted to system B (processing step 802). At this time, a step of copying memory from system A to system B (processing step 803) is initiated by memory extraction/insertion support means. Then the memory is extracted from system A (processing step 804) and the memory having the same capacity as system B is inserted (processing step 805). At this time, a step of copying memory from system B to system A (processing step 806) is initiated by the memory extraction/insertion support means. Lastly, memory expansion is completed after a status management table for managing the expanded memory is secured in the expanded portion of the two systems by a memory status management table securing means (processing step 807).

An embodiment that has two memory insertion slots on both system A and system B with one of two slots in both systems without memory insertion is described in the following with reference to FIGS. 9 and 11.

Figure 9:
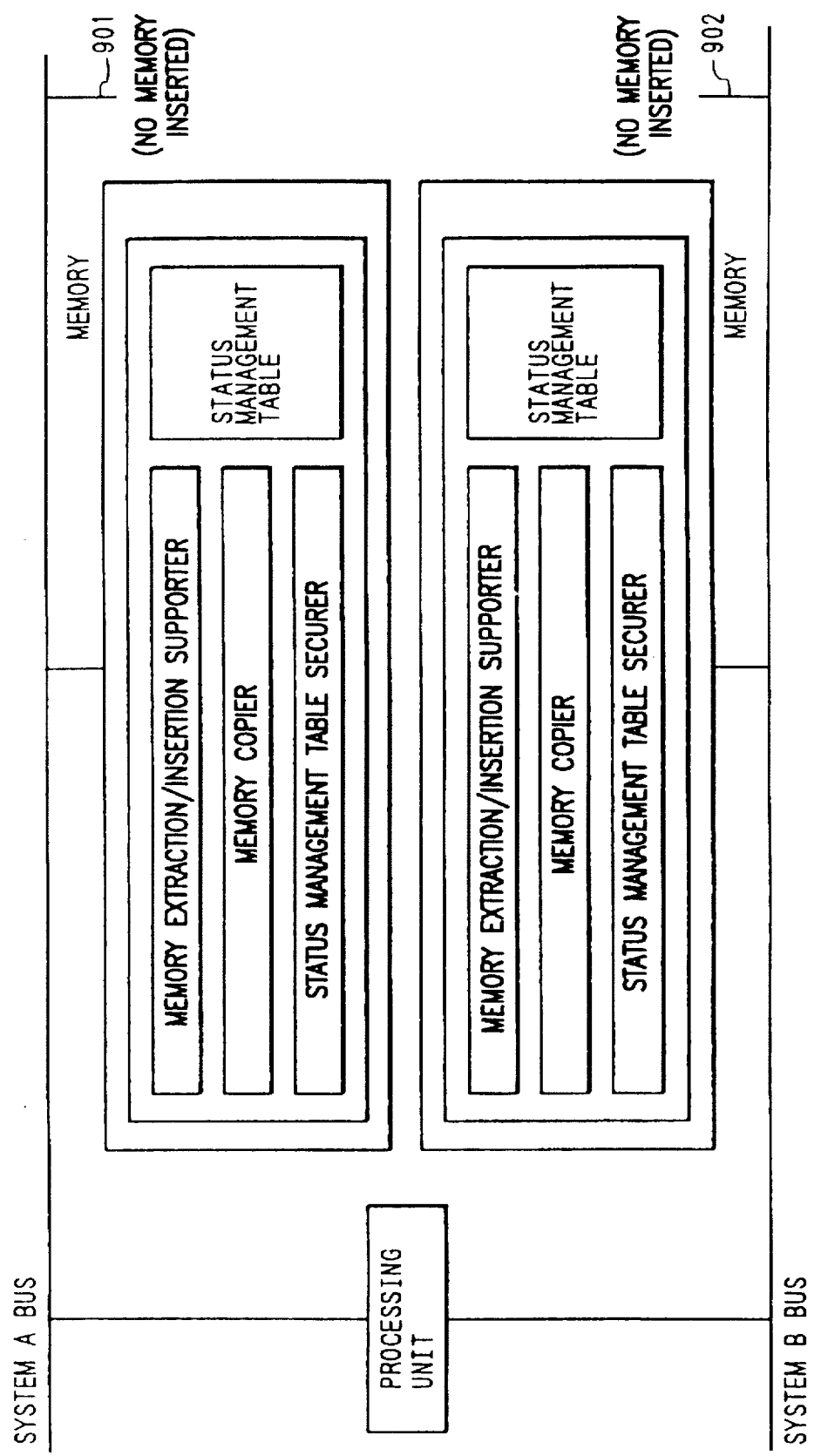
FIG. 9 is a schematic that facilitates an understanding of the operation of an embodiment of the present invention.

FIG. 9 is a diagram showing a status in which slots 901 and 902 exist on system A and system B respectively without installed memory.

Figure 10:
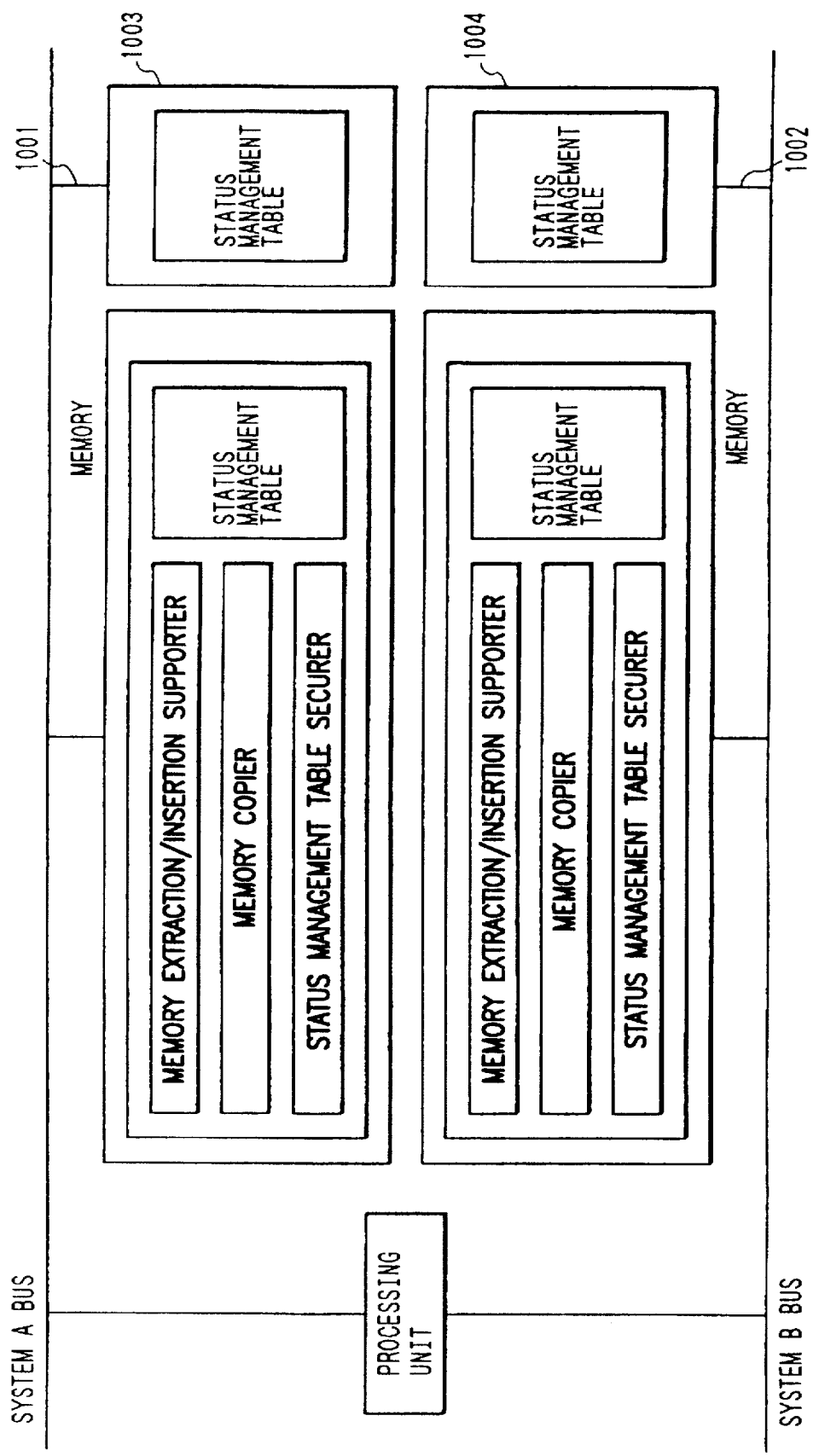
FIG. 10 is a schematic that facilitates an understanding of the operation of an embodiment of the present invention.

FIG. 10 is a diagram showing a status after memories 1003 and 1004 are inserted to slots 1001 and 1002 of system A and system B that previously had no memory installed.

Figure 11:
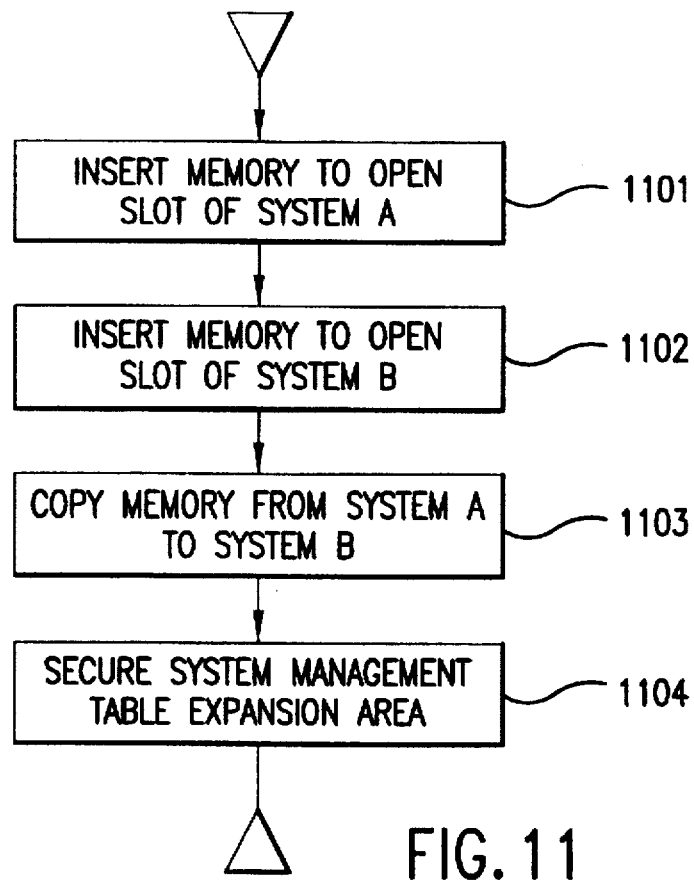
FIG. 11 is a schematic that facilitates an understanding of the operation of an embodiment of the present invention.

FIG. 11 is a diagram showing a processing flow when memories 1003 and 1004 are inserted to slots 1001 and 1002 of system A and system B that had no memory installed. First, when a memory is inserted to an open slot of system A, insertion of memory to system A (processing step 1101) is recognized by memory extraction/insertion support means. Then, when a memory is inserted to an open slot of system B, insertion of memory to system B (processing step 1102) is recognized by memory extraction/insertion support means and the memory copy from system A to system B is initiated up (processing step 1103). Lastly, memory expansion is completed after a memory management table for the expanded memory is secured in the expanded portion of the two systems by a memory status management table securing means (processing step 1104).

A support means for supporting memory extraction and insertion while on-line and a memory maintenance means which is equipped with a copying means for copying the memory content of one system to the memory of the other system will be explained by using FIGS. 12 to 14.

Figure 12:
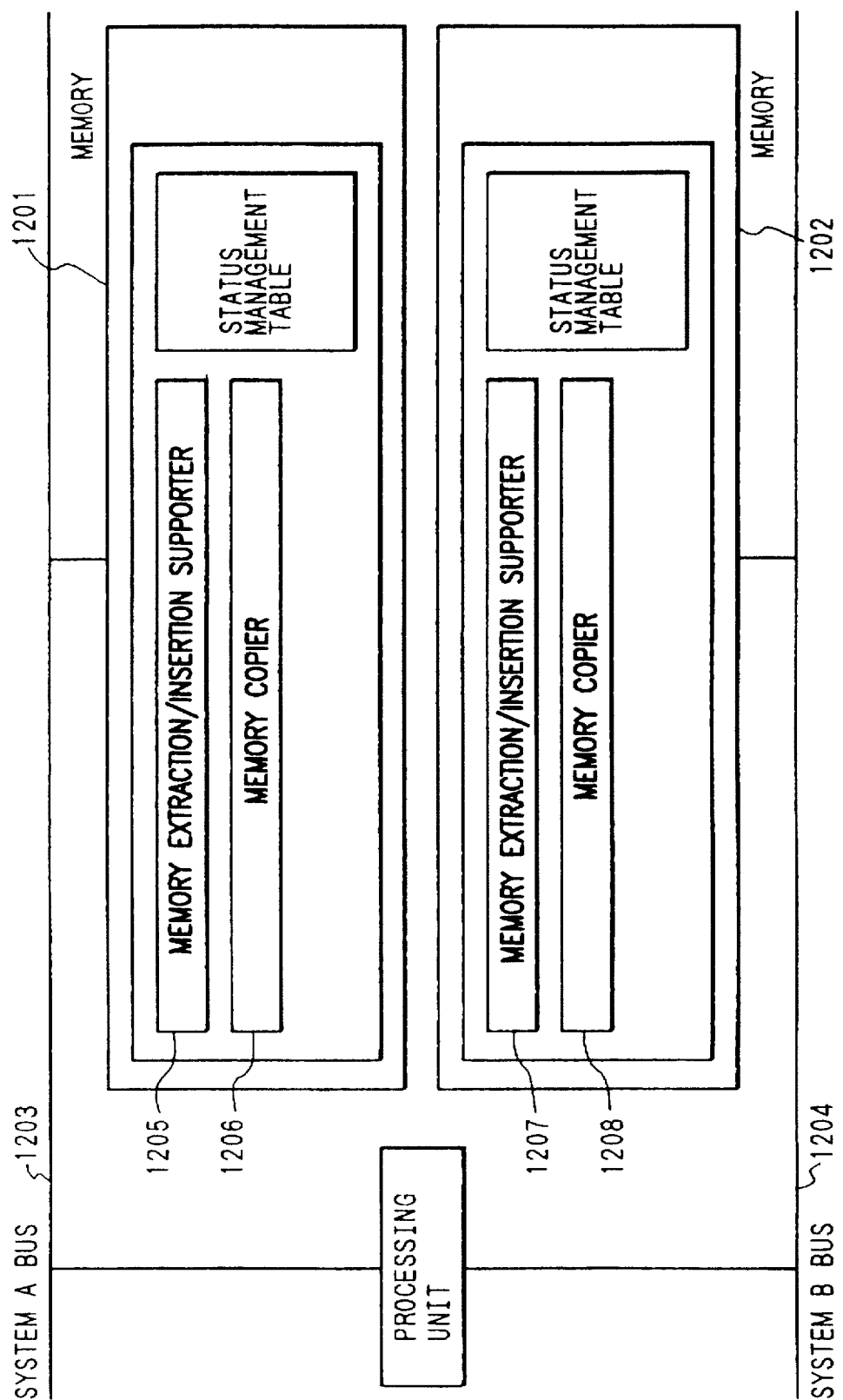
FIG. 12 is a diagram explaining the hardware configuration of another embodiment of the present invention.

FIGS. 12 is a diagram showing an example of hardware configuration in this case. Memories 1201 and 1202 are connected to system A bus 1203 and system B bus 1204, respectively, and contain memory extraction/insertion support means 1205 and 1207 as well as memory copying means 1206 and 1208.

The memory maintenance method in this embodiment will be explained by using FIGS. 13 and 14.

FIGS. 13A and 13B are diagrams showing the status of system B after extracting memory 1301 and inserting memory 1302. The content of system A memory 1301 is copied to system B memory 1302 by a memory copying means 1304.

Figure 14:
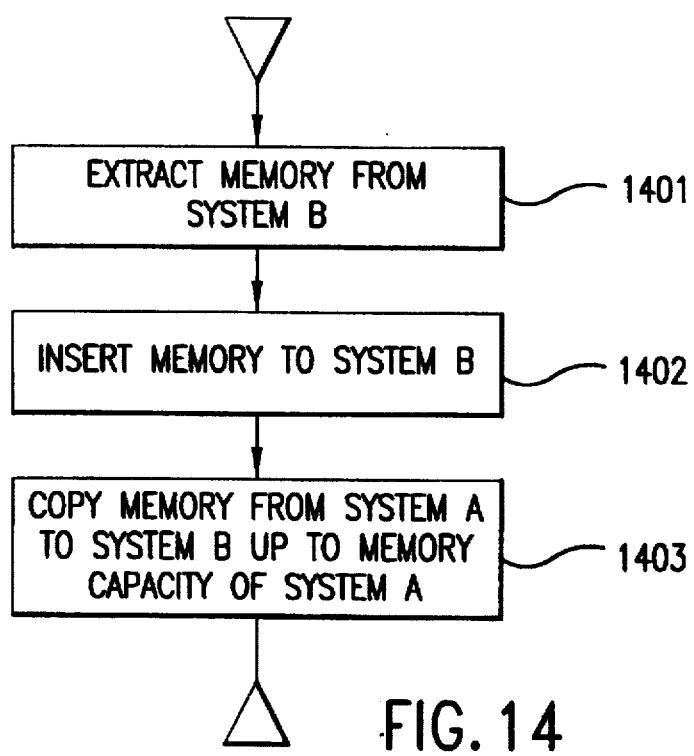
FIG. 14 is a diagram explaining a fourth embodiment of the present invention.

FIG. 14 shows a processing flow when the memory of system B is replaced with a memory of the same capacity. The capacity of system B memory is renewed after the system B memory is extracted (processing step 1401) and memory copy from system A to system B is initiated after the memory is inserted to system B (processing step 1402). In memory copy (processing step 1403), memory exchange is completed after copying is performed up to the capacity of system A memory.

Figure 15:
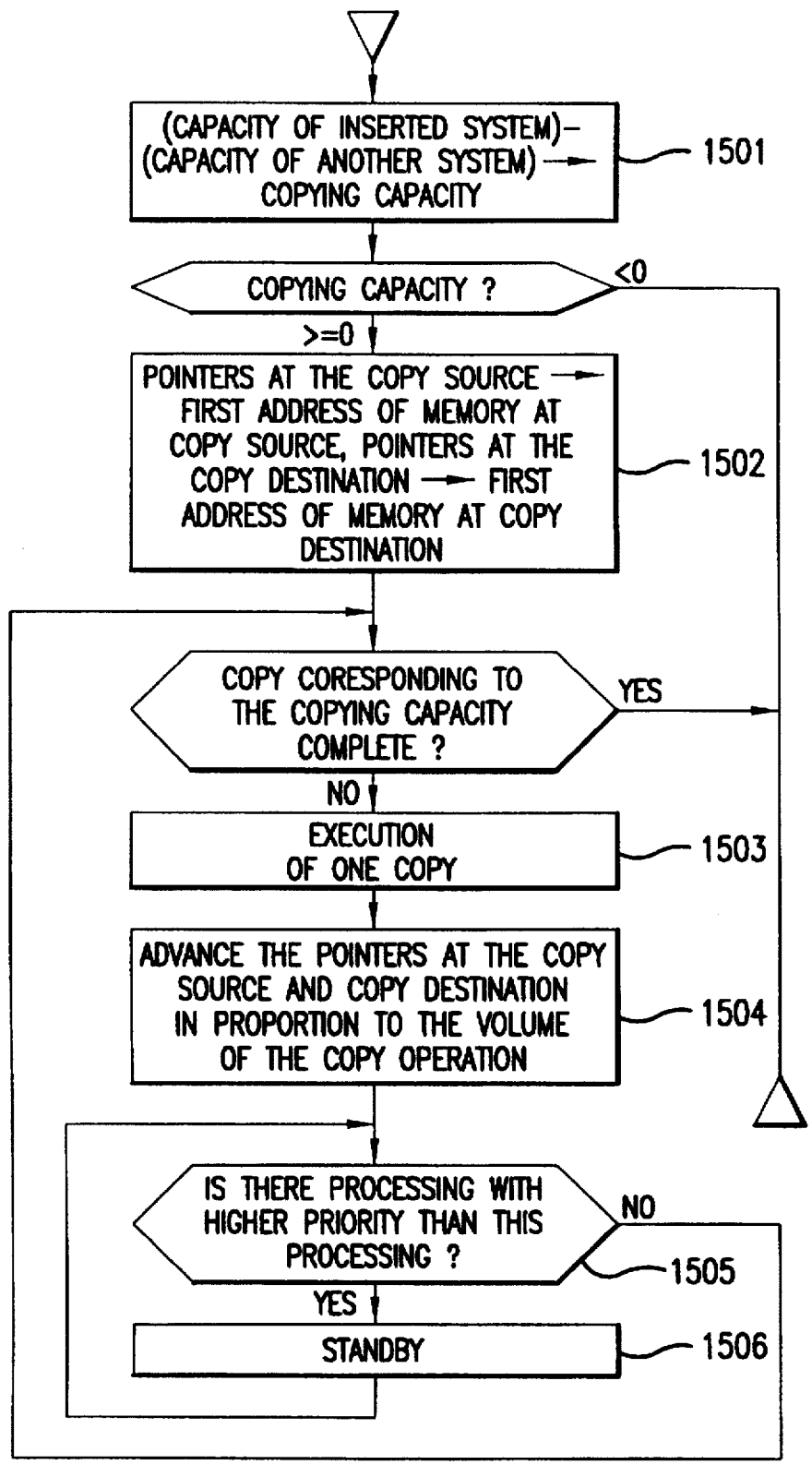
FIG. 15 is a diagram explaining a fifth embodiment of the present invention.

FIG. 15 is a diagram explaining a memory copying means that takes processing priority into consideration. First, the copying capacity is obtained by subtracting the installing capacity of another system from the memory installing capacity of the inserted system (processing step 1501). The copying is not performed if this value is negative. If the memory capacity of the inserted system is greater than or equal to the capacity of the other system, the pointers at the copy source and copy destination are set on the first address of the copy source and copy destination, respectively (processing step 1502), and the pointers at the copy source and copy destination are advanced in proportion to the volume of one copy in processing step 1504 every time a single copy is executed in processing step 1503. Before performing the next copy, it is determined whether there is a processing with higher priority in the system than the one that is being executed at present (processing step 1505) and go on standby if such processing exists (processing step 1506). As a result, the OS will shift the control to processing with higher priority. Once the processing with higher priority is completed or put on standby, the control is shifted to a memory copying means by the OS. Copying processing is completed once copying corresponding to the copying capacity is completed.

Figure 16:
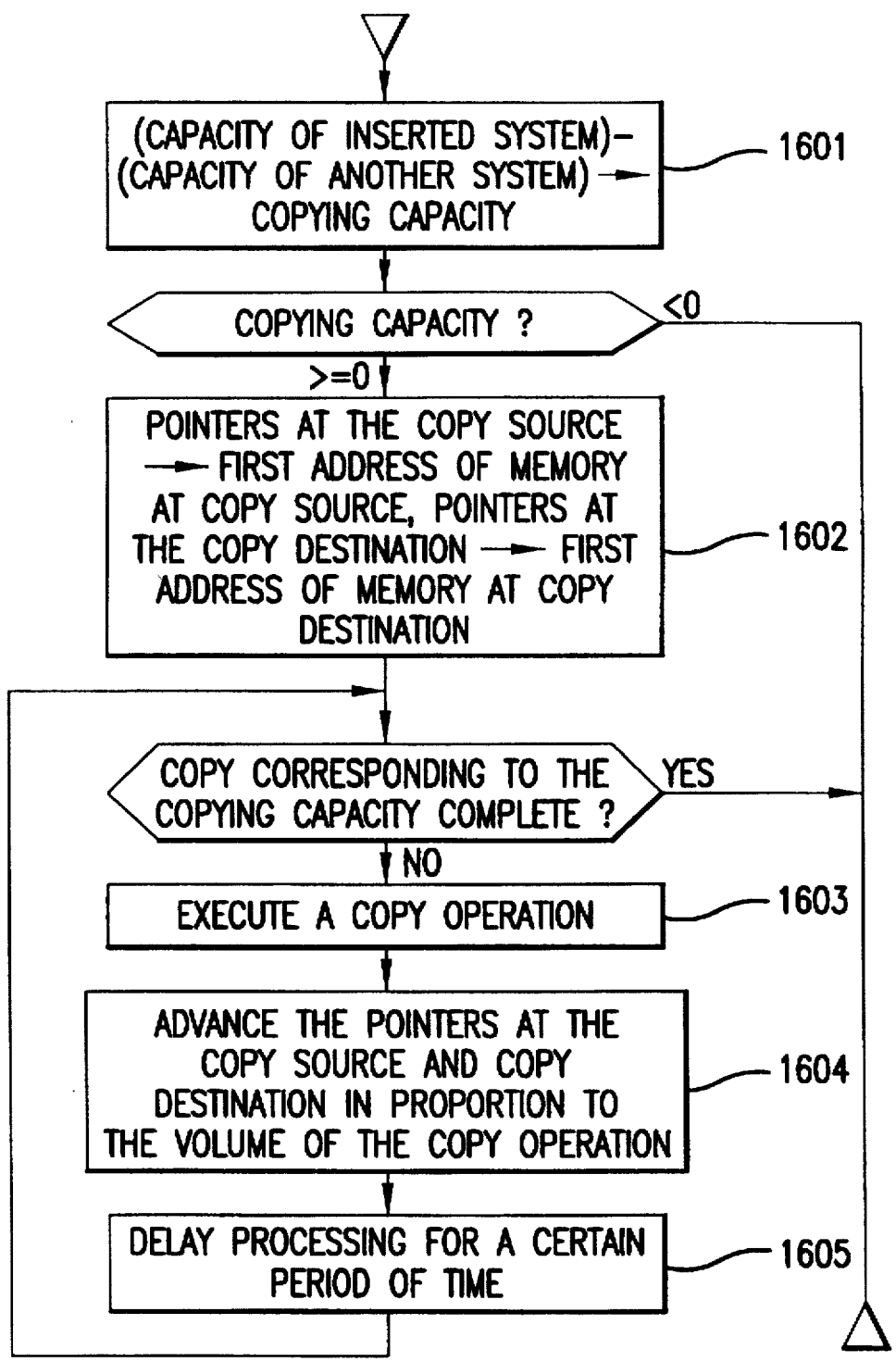
FIG. 16 is a diagram explaining a sixth embodiment of the present invention.

FIG. 16 is a diagram explaining a memory copying means that takes processing delay into consideration. First, the copying capacity is obtained by subtracting the capacity of another system from the memory capacity of the inserted system (processing step 1601). The copying is not performed if this value is negative. If the memory capacity of the inserted system is greater than or equal to the capacity of the other system, the pointers at the copy source and copy destination are set on the first address of the copy source and copy destination, respectively (processing step 1602), and the pointers at the copy source and copy destination are advanced in proportion to the volume of one copy (processing step 1604) every time a single copy is executed (processing step 1603). Before performing the next copy, discontinue the processing for a certain period of time (processing step 1605). The OS will shift control to another processing while the processing is discontinued. After a certain period of time has elapsed, the control is shifted to a memory copying means by OS. Copying processing is completed once copying corresponding to the copying capacity is completed.

The present invention has the following effects with regard to maintenance work during on-line operation of a computer system including a dual memory configuration.

(1) Memory expansion can be performed in a computer with no slot for adding memory by exchanging the installed memory with memory that has greater capacity.

(2) Memory expansion can be performed in a computer with a slot for adding memory by installing additional memory.

(3) The installed memory can be replaced with a memory of the same capacity.

(4) CPU load on on-line processing can be controlled during memory copying processing by delaying the processing.

(5) Memory can be used efficiently as it is not necessary to secure a memory status management table area for the expanded memory in advance of the memory.

What is claimed is:

1. A computer system including a dual memory configuration, wherein said dual memory configuration comprises a first memory coupled to a first bus and a second memory coupled to a second bus, wherein said computer system supports an on-line memory extraction of the second memory and an insertion of a third memory coupled to the second bus, said computer system comprising:

a processor coupled to said first and second bus;

wherein said first memory comprises:

an original memory status management table;

means for supporting the extraction and the insertion during on-line operation, said supporting means determining whether a capacity of the third memory is greater than a capacity of the second memory;

means for copying a memory content of said first memory to the third memory if said supporting means determines that said third memory capacity is greater than said second memory capacity; and means for securing an expanded memory status management table corresponding to the third memory if said supporting means determines that said third memory capacity is greater than said second memory capacity, and linking said expanded memory status management table to said original memory management status management table.

2. The computer system according to claim 1 wherein said system further supports an on-line second memory extraction of the first memory and a second insertion of a fourth memory coupled to the first bus, wherein said second memory comprises:

a second means for supporting the second extraction and the second insertion during on-line operation, said second supporting means determining whether a capacity of the fourth memory is greater than a capacity of the first memory; and a second copying means for copying a memory content of said second memory to the fourth memory if said second supporting means determines that said fourth memory capacity is greater than said first memory capacity.

3. The computer system according to claim 1, wherein said means for copying executes a copying operation in accordance with a predetermined priority.

4. The computer system according to claim 1, wherein said means for copying comprises means for beginning the copying, delaying the copying for a predetermined time and then continuing the copying.

* * * * *